(12) United States Patent
Duan et al.

(10) Patent No.: US 9,779,324 B2
(45) Date of Patent: Oct. 3, 2017

(54) METHOD AND DEVICE FOR DETECTING INTEREST POINTS IN IMAGE

(71) Applicant: PEKING UNIVERSITY, Beijing (CN)

(72) Inventors: Lingyu Duan, Beijing (CN); Jie Chen, Beijing (CN); Fangkun Wang, Beijing (CN); Tiejun Huang, Beijing (CN); Wen Gao, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 175 days.

(21) Appl. No.: 14/880,981

(22) Filed: Oct. 12, 2015

(65) Prior Publication Data

US 2016/0034780 A1 Feb. 4, 2016

Related U.S. Application Data

(63) Continuation of application No. PCT/CN2014/074927, filed on Apr. 8, 2014.

(30) Foreign Application Priority Data

Apr. 12, 2013 (CN) .......................... 2013 1 0126255

(51) Int. Cl.
*G06K 9/46* (2006.01)
*G06K 9/52* (2006.01)
(Continued)

(52) U.S. Cl.
CPC ......... *G06K 9/4671* (2013.01); *G06K 9/4619* (2013.01); *G06K 9/4642* (2013.01);
(Continued)

(58) Field of Classification Search
None
See application file for complete search history.

(56) References Cited

U.S. PATENT DOCUMENTS

| | | | |
|---|---|---|---|
| 2008/0253675 A1* | 10/2008 | Chou | H04N 5/217 382/255 |
| 2011/0142330 A1* | 6/2011 | Min | G06T 3/4046 382/159 |
| 2012/0328161 A1* | 12/2012 | Palenychka | G06K 9/00771 382/107 |

FOREIGN PATENT DOCUMENTS

| | | |
|---|---|---|
| CN | 101540046 A | 9/2009 |
| CN | 102254144 A | 11/2011 |

(Continued)

OTHER PUBLICATIONS

International Search Report of corresponding International PCT Application No. PCT/CN2014/074927, dated Jul. 8, 2014.

(Continued)

*Primary Examiner* — Delomia L Gilliard
(74) *Attorney, Agent, or Firm* — J.C. Patents (57) ABSTRACT

The present invention provides a method and a device for detecting interest points in an image. The method includes: acquiring an original input image; performing down-sampling processing on the original input image, so as to obtain a plurality of sampling images with different resolutions; dividing each sampling image into a plurality of small image blocks; performing filtering processing on the plurality of small image blocks in each sampling image in sequence by using Laplacian-of-Gaussian filters, so as to obtain filtered images of the plurality of small image blocks in each sampling image; and acquiring interest points in an image in filtered images of the plurality of small image blocks in each sampling image. The present invention is used for solving the problems of more memory consumption and a low detection speed in the prior art.

10 Claims, 5 Drawing Sheets

(51) Int. Cl.
*G06T 3/00* (2006.01)
*G06T 3/40* (2006.01)
*G06T 7/60* (2017.01)

(52) U.S. Cl.
CPC .................. *G06K 9/52* (2013.01); *G06T 3/00* (2013.01); *G06T 3/40* (2013.01); *G06T 3/4084* (2013.01); *G06T 7/60* (2013.01); *G06K 2009/4666* (2013.01); *G06T 2207/20021* (2013.01); *G06T 2207/20024* (2013.01); *G06T 2207/20056* (2013.01)

(56) References Cited

FOREIGN PATENT DOCUMENTS

| | | |
|---|---|---|
| CN | 102282572 A | 12/2011 |
| CN | 103020630 A | 4/2013 |
| CN | 103235949 A | 8/2013 |

OTHER PUBLICATIONS

Chinese First Examination Report of corresponding China patent application No. 201310126255.8, dated Sep. 2, 2015.

\* cited by examiner

FIG. 1

```
┌─────────────────────────────────────────────────┐
│  The device for detecting interest points in an image │
│  divides each sampling image into a plurality of small │
│  square image blocks having a width of X and a height of │
│  Y, wherein, both X and Y are positive integers, if the │      1031
│  small image block at the boundary of the sampling │
│  image has a width less than X or a height less than Y, │
│  then fills the small image block at the boundary of the │
│  sampling image with pixels │
└─────────────────────────────────────────────────┘
                          ↓
┌─────────────────────────────────────────────────┐
│  The device for detecting interest points in an image fills │
│  each small square image block having a width of X and a │      1032
│  height of Y with pixels, so that the filled small square │
│  image block has a width of X+M-1 and a height of │
│  Y+M-1, wherein M is an positive integer │
└─────────────────────────────────────────────────┘
                          ↓
┌─────────────────────────────────────────────────┐
│  Perform a discrete Fourier transform on the filled small │      1033
│  square image block, so as to obtain frequency domain │
│  small image blocks │
└─────────────────────────────────────────────────┘
```

METHOD AND DEVICE FOR DETECTING INTEREST POINTS IN IMAGE

CROSS-REFERENCE TO RELATED APPLICATIONS

This application is a continuation of International Application No. PCT/CN2014/074927, filed on Apr. 8, 2014, which claims priority to Chinese Patent Application No. 201310126255.8, filed on Apr. 12, 2013, both of which are hereby incorporated by reference in their entireties.

TECHNICAL FIELD

The present invention relates to image processing techniques, and more particularly to a method and a device for detecting interest points in an image.

BACKGROUND

The mobile visual search is a very humane information retrieval manner, is to recognize objects in an image with a computer vision method, and to correlate objects to be recognized in the image with relevant virtual digital information, so that the user can retrieve various relevant information without inputting any keyword. One of the key technologies for the mobile visual search is the technology for detecting interest points in an image, which refers to find a certain amount of flags in the image, these flags are featured in that, these flags also can be detected in another image containing the same object at the same position of the object, even if the two images have different sizes or are taken under different lighting conditions or at different viewpoint.

In the prior art, the device for detecting interest points in an image performs down-sampling on an original image, generates an image pyramid with a series of gradually reduced resolutions; acquires multi-scale images of each layer image in the image pyramid by using a plurality of spatial domain Gaussian filters; acquires a multi-scale Laplacian-of-Gaussian response image of each layer image by using a spatial domain Laplacian filter, and acquires interest points of each layer image according to the multi-scale Laplacian-of-Gaussian response image.

However, in the prior art, after acquiring the multi-scale images of each layer image in the image pyramid by using Gaussian filters, there is a need to buffer the multi-scale image of each layer image in the image pyramid, resulting in more memory consumption and a low detection speed.

SUMMARY

The present invention provides a method and a device for detecting interest points in an image, for solving the problems of more memory consumption and a low detection speed in the prior art.

One aspect of the present invention provides a method for detecting interest points in an image, including:
acquiring an original input image;
performing down-sampling processing on the original input image, so as to obtain a plurality of sampling images with different resolutions;
dividing each sampling image into a plurality of small image blocks;
performing filtering processing on the plurality of small image blocks in each sampling image in sequence by using Laplacian-of-Gaussian filters, so as to obtain filtered images of the plurality of small image blocks in each sampling image; and
acquiring interest points in an image in each sampling image, according to the filtered images of the plurality of small image blocks in each sampling image.

Another aspect of the present invention provides a device for detecting interest points in an image, including:
an acquiring module, configured to acquire an original input image;
a processing module, configured to perform down-sampling processing on the original input image, so as to obtain a plurality of sampling images with different resolutions;
a dividing module, configured to divide each sampling image into a plurality of small image blocks;
a filtering module, configured to perform filtering processing on the plurality of small image blocks in each sampling image in sequence by using Laplacian-of-Gaussian filters, so as to obtain filtered images of the plurality of small image blocks in each sampling image;
wherein the acquiring module is further configured to acquire interest points in an image in each sampling image, according to the filtered images of the plurality of small image blocks in each sampling image.

In the present invention, divide each sampling image into a plurality of small image blocks, with regard to each small image block, perform filtering processing by using Laplacian-of-Gaussian filters, search interest points in an image, and obtain filtered images of the plurality of small image blocks, thus reducing memory consumption and improving the detection speed.

DESCRIPTION OF EMBODIMENTS

In order to make the objects, technical solutions, and advantages of the embodiments of the present invention clearer, the technical solutions in the embodiments of the present invention are hereinafter described clearly and completely with reference to the accompanying drawings in the embodiments of the present invention. Obviously, the embodiments described here are part of the embodiments of the present invention and not all of the embodiments. All other embodiments, which can be derived by persons skilled in the art from the embodiments given herein without creative efforts, shall fall within the protection scope of the present invention.

Figure 1:
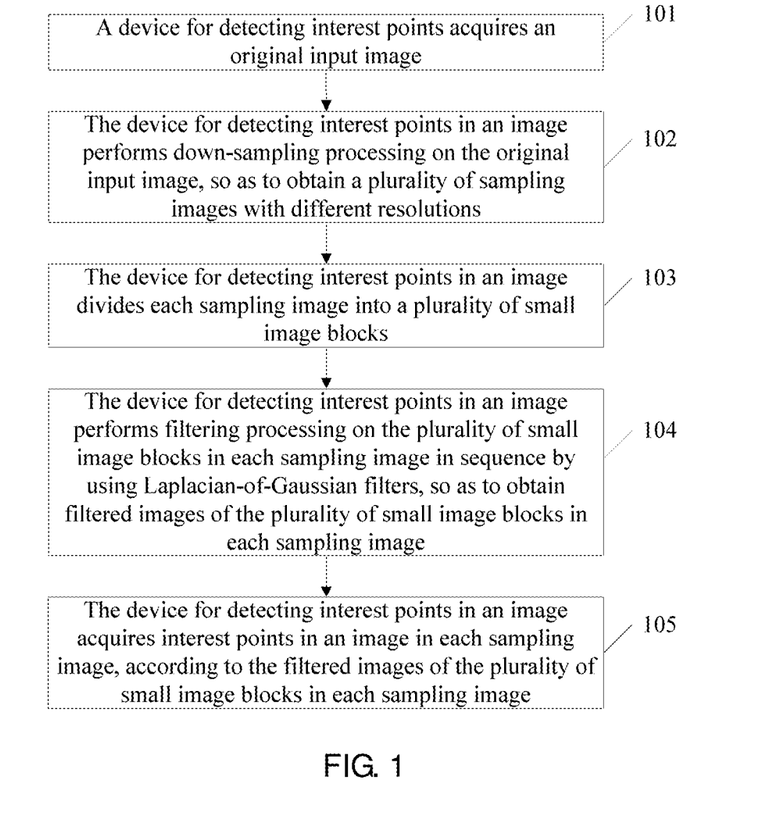
FIG. 1 is a flow chart of a method for detecting interest points in an image according to an embodiment of the present invention.

FIG. 1 is a flow chart of a method for detecting interest points in an image according to an embodiment of the present invention, as shown in FIG. 1, the entity for executing the method for detecting interest points in an image according to the present invention can be a module having a processing function in terminal devices, such as a camera, a camcorder, a camera head, a computer or a mobile phone, for example, CPU. The method includes:

101, A device for detecting interest points acquires an original input image.

The original input image can be an image acquired by a device being able to take pictures, such as a camera, a camcorder, a camera head, a computer or a mobile phone.

102, The device for detecting interest points in an image performs down-sampling processing on the original input image, so as to obtain a plurality of sampling images with different resolutions.

The down-sampling processing means that, the device for detecting interest points in an image performs filtering on the original input image, then performs sampling with a step length of 2, and generates multistage sampling images with gradually reduced resolutions. The filtering manner adopted before sampling is generally Gaussian low pass filtering or neighborhood mean filtering. The device for detecting interest points in an image can detect interest points in an image on a sampling image of each resolution, and then collects all the detected interest points in an image of the sampling image together as interest points for the original input image.

103, The device for detecting interest points in an image divides each sampling image into a plurality of small image blocks.

Particularly, the plurality of small image blocks obtained by dividing each sampling image can be of a square, or a rectangular shape.

104, The device for detecting interest points in an image performs filtering processing on the plurality of small image blocks in each sampling image in sequence by using Laplacian-of-Gaussian filters, so as to obtain filtered images of the plurality of small image blocks in each sampling image.

Wherein, the Laplacian-of-Gaussian filter is generated by the Gaussian filter and the Laplacian filter, the device for detecting interest points in an image can perform filtering processing on the plurality of small image blocks in each sampling image by using Laplacian-of-Gaussian filters, so as to obtain filtered images of the plurality of small image blocks in each sampling image; the device for detecting interest points in an image also can split the Laplacian-of-Gaussian filter into a Gaussian filter and a Laplacian filter, and perform filtering processing on the plurality of small image blocks in each sampling image in sequence by using the Gaussian filter and the Laplacian filter. The effect of performing filtering processing on the plurality of small image blocks in each sampling image by using Gaussian filters is to construct a multi-scale image layer of each small image block in the sampling image. The effect of using the Laplacian filter is to calculate a response value for each pixel point in the multi-scale image layer of each small image block, so that the device for detecting interest points in an image can perform extreme point searching in a three-dimensional space consisting of the above multi-scale image layers according to the response value for each pixel point in the multi-scale image layer of each small image block, so as to determine the position corresponding to the interest points in the image. Wherein, the response value corresponding to the Laplacian operator in the Laplacian filter is sensitive to a speckle in the image, extreme point searching is performed in a three-dimensional space consisting of the above multi-scale image layers according to the response value calculated by the Laplacian operator, so that a better speckle detection effect can be achieved. The multi-scale image layers are obtained by filtering small image blocks with Gaussian filters, and have the same resolutions.

105, The device for detecting interest points in an image acquires interest points in an image in each sampling image, according to the filtered images of the plurality of small image blocks in each sampling image.

In an implementation scenario, the device for detecting interest points in an image can acquire interest points in an image of each small image block, according to the filtered images of the plurality of small image blocks in each sampling image, and acquire interest points in an image in each sampling image, according to the interest points in the image of each small image block.

In another implementation scenario, the device for detecting interest points in an image can merge filtered images of the plurality of small image blocks in each sampling image, so as to obtain a filtered image of each sampling image, and acquire interest points in each sampling image, according to the filtered image of each sampling image.

Moreover, the device for detecting interest points in an image also can merge filtered images of parts of small image blocks in each sampling image, so as to obtain a filtered image of large image blocks, and acquire interest points in an image of a plurality of large image blocks in each sampling image, and then acquire interest points in an image of each sampling image, according to interest points in an image of each large image block in each sampling image.

It should be noted that, the device for detecting interest points in an image can firstly acquire one of the plurality of small image blocks in the sampling image, perform filtering processing on the small image block in sequence by using Laplacian-of-Gaussian filters, so as to obtain a filtered image of the small image block, and acquire interest points in an image of the small image block, according to the filtered image of the small image block; then the device for detecting interest points in an image can acquire the next of the plurality of small image blocks in the sampling image for processing. Moreover, the device for detecting interest points in an image also can perform processing in parallel on the plurality of small image blocks in the sampling image. After acquiring all the interest points in an image of the plurality of small image blocks in the sampling image, the device for detecting interest points in an image also can acquire a feature point in the sampling image according to the interest points in the image, and recognize an object in the image according to the feature point.

In the method for detecting interest points in an image provided in this embodiment, divide each sampling image into a plurality of small image blocks, with regard to each small image block, perform filtering processing by using Laplacian-of-Gaussian filters, search interest points in an image, and obtain filtered images of the plurality of small image blocks, thus reducing memory consumption and improving the detection speed.

Figure 2:
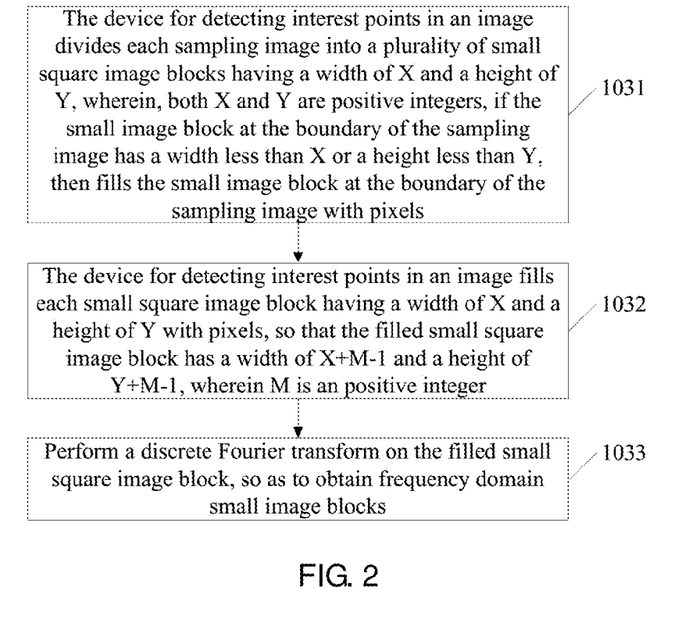
FIG. 2 is a flow chart of dividing each sampling image into a plurality of small image blocks in a method for detecting interest points in an image according to an embodiment of the present invention.

FIG. 2 is a flow chart of dividing each sampling image into a plurality of small image blocks in a method for detecting interest points in an image according to an embodiment of the present invention, as shown in FIG. 2, on the basis of the embodiments shown in FIG. 1, the dividing each sampling image into a plurality of small image blocks particularly includes:

1031, The device for detecting interest points in an image divides each sampling image into a plurality of small square image blocks having a width of X and a height of Y, wherein, both X and Y are positive integers, if the small image block at the boundary of the sampling image has a width less than X or a height less than Y, then fills the small image block at the boundary of the sampling image with pixels.

Figure 3:
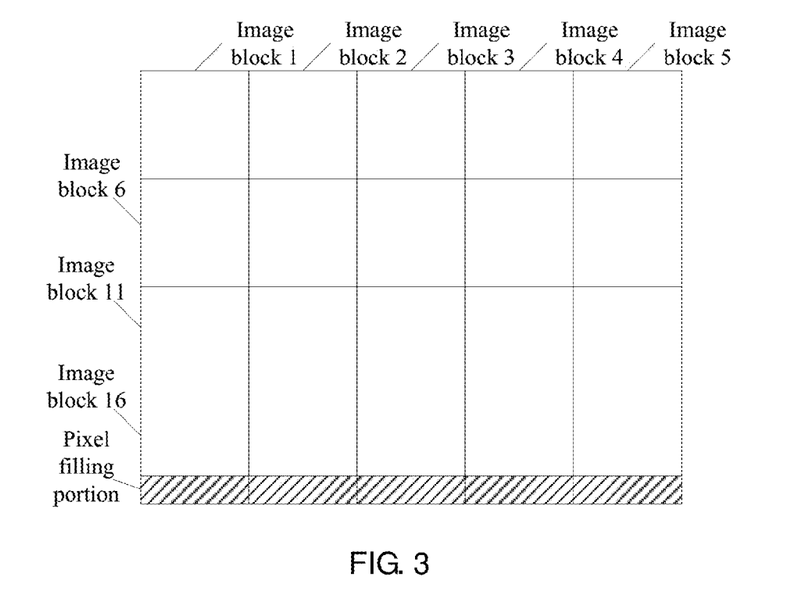
FIG. 3 is a schematic diagram of dividing a sampling image into a plurality of small square image blocks of 128*128 square pixels.

The device for detecting interest points in an image can divide in sequence from the upper left of the sampling image, patch a pixel value of 0 at the boundary thereof for the portion having a width less than X or a height less than Y, to make a size of X*Y square pixels, and store the divided plurality of small image blocks. When both X and Y are 128 pixels, the device for detecting interest points in an image may detect more interest points in an image, the obtained interest points may have a higher performance in image retrieval and matching. Therefore, preferably, both X and Y are 128 pixels. For example, a sampling image with a resolution of 640*480 square pixels can be divided by row and then column into 20 small blocks of 5*4, as shown in FIG. 3, where the first 15 small blocks can be directly obtained by dividing, and the latter 5 small blocks will be patched with 32 pixels to fill into a size of 128*128 square pixels. Moreover, the sampling image also can be divided by column and then row.

1032, The device for detecting interest points in an image fills each small square image block having a width of X and a height of Y with pixels, so that the filled small square image block has a width of X+M−1 and a height of Y+M−1, wherein M is an positive integer.

The device for detecting interest points in an image fills each small square image block having a width of X and a height of Y with pixels in a manner that, when M is an odd number, fill the four sides of each small square image block having a width of X and a height of Y with (M−1)/2 pixels; when M is an even number, fill the four sides of each small square image block having a width of X and a height of Y with (M)/2 pixels. In a case, the filled pixel value can be a mirror image of a boundary pixel value of the small square image block having a width of X and a height of Y; in another case, the filled pixel value also can be 0; in still another case, the device for detecting interest points in an image can judge whether the small image block is located at a position of the sampling image, if the small image block is located at a boundary of the sampling image, then can fill the side of the small image block at the boundary of the sampling image with 0, and fill other sides of the small image block not at the boundary of the sampling image into a mirror image of the small image block. Moreover, preferably, M can be less than or equal to X and be less than or equal to Y, so as to improve an accuracy of a filtering effect of a Laplacian-of-Gaussian filter.

1033, Perform a discrete Fourier transform on the filled small square image block, so as to obtain frequency domain small image blocks.

In the method for detecting interest points in an image provided in this embodiment, divide each sampling image into a plurality of small square image blocks having a width of X and a height of Y, with regard to each small image block having a width of X and a height of Y, perform pixel filling and a discrete Fourier transform, so as to obtain frequency domain small image blocks, with regard to each frequency domain small image block, perform filtering processing by using Laplacian-of-Gaussian filters, search interest points in an image, and obtain filtered images of each small image blocks, thus reducing memory consumption, place the plurality of small image blocks in the sampling image in the frequency domain for processing, thus further improving the detection speed.

Figure 4:
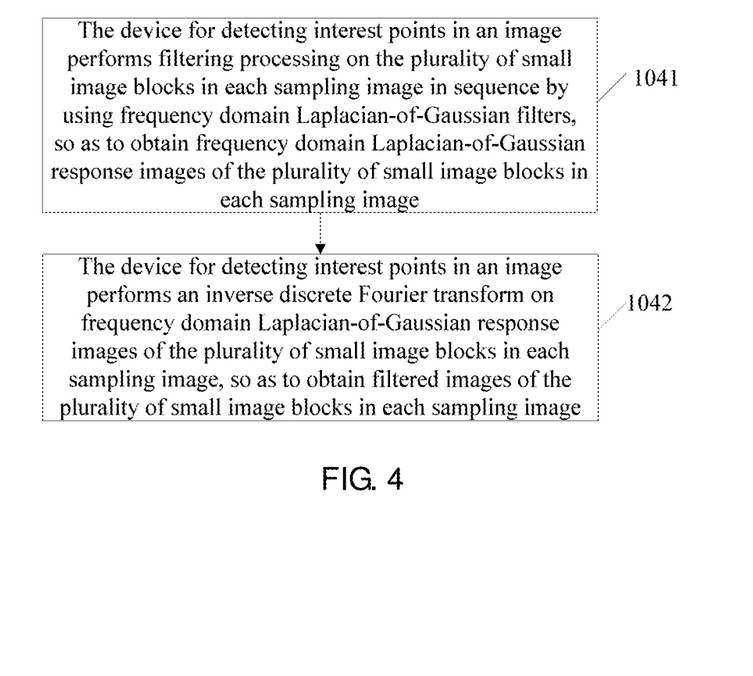
FIG. 4 is a flow chart of performing filtering processing on a plurality of small image blocks in each sampling image in sequence by using Laplacian-of-Gaussian filters in a method for detecting interest points in an image according to an embodiment of the present invention.

FIG. 4 is a flow chart of performing filtering processing on a plurality of small image blocks in each sampling image in sequence by using Laplacian-of-Gaussian filters in a method for detecting interest points in an image according to an embodiment of the present invention, as shown in FIG. 4, on the basis of the embodiments shown in FIG. 2, it particularly includes:

1041, The device for detecting interest points in an image performs filtering processing on the plurality of small image blocks in each sampling image in sequence by using frequency domain Laplacian-of-Gaussian filters, so as to obtain frequency domain Laplacian-of-Gaussian response images of the plurality of small image blocks in each sampling image.

Wherein, there are a plurality of frequency domain Laplacian-of-Gaussian filters, the device for detecting interest points in an image can perform filtering processing on each small image block in sequence by using the plurality of frequency domain Laplacian-of-Gaussian filters, so as to obtain a plurality of filtered images of each small image block. The small image block mentioned hereinafter particularly refers to a frequency domain small image block.

Figure 5:
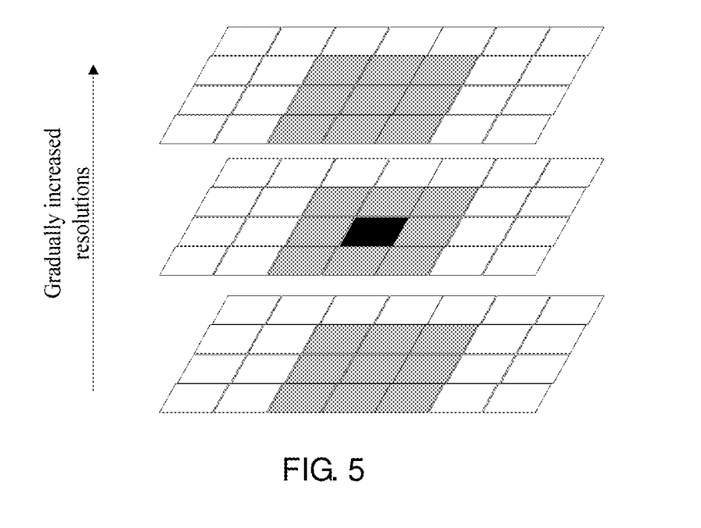
FIG. 5 is a schematic diagram of searching an interest point in an image in a three-dimensional space consisting of filtered images of a plurality of small image blocks.

Furthermore, the device for detecting interest points in an image can convert a plurality of frequency domain Laplacian-of-Gaussian response images of each small image block into spatial domain, so as to obtain a plurality of filtered images of each small image block, and then the device for detecting interest points in an image can make a partial comparison to Laplacian-of-Gaussian response values in a three-dimensional space consisting of a plurality of filtered images of each small image block according to the plurality of filtered images of each small image block. As shown in FIG. 5, as for each pixel point of a plurality of filtered images of each small image block, compare the response value thereof and response values of the surrounding 26 pixel points, if the pixel point has a response value more than or less than all the surrounding pixel points, then take the pixel point as a candidate interest point in an image; calculate Hessian matrix response value of positions corresponding to these candidate interest points in the image, consider the point with a response value more than a preset threshold as a boundary point and get rid of the point, and remaining interest points are interest points in the image.

Furthermore, before performing filtering processing on the plurality of small image blocks in each sampling image in sequence by using Laplacian-of-Gaussian filters, so as to obtain filtered images of the plurality of small image blocks in each sampling image, the device for detecting interest points in an image also can generate a plurality of square spatial domain two-dimensional Gaussian filters and a square spatial domain two-dimensional Laplacian filter respectively, and perform pixel filling on the plurality of square spatial domain two-dimensional Gaussian filters and the square spatial domain two-dimensional Laplacian filter, so that the filled spatial domain two-dimensional Gaussian filter and spatial domain two-dimensional Laplacian filter have the same width and height with the filled small square image blocks, thus the frequency domain Gaussian filter and the frequency domain Laplacian filter have the same width and height with the frequency domain small square image blocks, thereby a operation quantity of the device for detecting interest points in an image can be reduced, and the detection speed can be improved. For example, the device for detecting interest points in an image also can generate a plurality of square spatial domain two-dimensional Gaussian filters, according to a two-dimensional Gaussian kernel function and a preset Gaussian parameter, and the plurality of square spatial domain two-dimensional Gaussian filters have a maximum width of M;

generate a square spatial domain two-dimensional Laplacian filter, according to a second-order Laplacian operator function, if the square spatial domain two-dimensional Laplacian filter has a width less than M, and fill square spatial domain two-dimensional Laplacian filter with pixels, so that the filled square spatial domain two-dimensional Laplacian filter has a width of M;

convert the plurality of square spatial domain two-dimensional Gaussian filters into the plurality of frequency domain Gaussian filters, wherein, each frequency domain Gaussian filter is used to perform filtering processing on the plurality of small image blocks in each sampling image in sequence; and convert the filled square spatial domain two-dimensional Laplacian filter into the frequency domain Laplacian filter.

Figure 6:
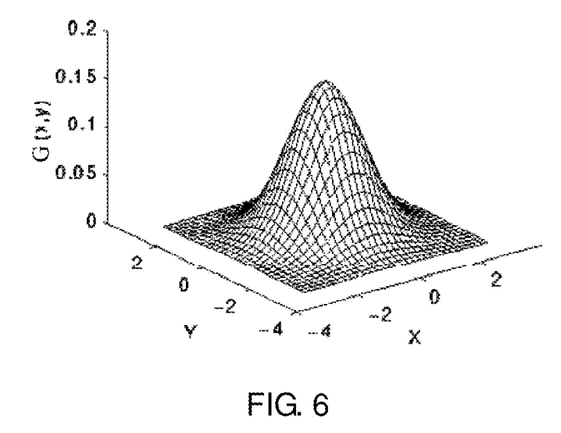
FIG. 6 is a schematic diagram of a square spatial domain two-dimensional Gaussian filter when σ=1.

Wherein, a schematic diagram of a square spatial domain two-dimensional Gaussian filter when σ=1 is as shown in FIG. 6, and corresponding coordinated point values are as shown in Table 1, a width of the square spatial domain two-dimensional Gaussian filter refers to a width for an area with a non-zero value in the schematic diagram of the square spatial domain two-dimensional Gaussian filter. As shown in table 1, the square spatial domain two-dimensional Gaussian filter has a width 5, when σ=1. Multiple frequency domain images with different scales corresponding to the small image block will be obtained by performing processing on the small image block with Gaussian filters of different widths.

TABLE 1

| 1/273 | | | | |
|---|---|---|---|---|
| 1 | 4 | 7 | 4 | 1 |
| 4 | 16 | 26 | 16 | 4 |
| 7 | 26 | 41 | 26 | 7 |
| 4 | 16 | 26 | 16 | 4 |
| 1 | 4 | 7 | 4 | 1 |

The device for detecting interest points in an image is further configured to fill symmetrically around the square spatial domain two-dimensional Gaussian filter having a width less than M with pixels, the filled pixel value is 0, so that the filled square spatial domain two-dimensional Gaussian filter has a width of M. For example, if M is 7, fill the square spatial domain two-dimensional Gaussian filter having a width of 5 to obtain a square spatial domain two-dimensional Gaussian filter having a width of 7, as shown in Table 2.

TABLE 2

| 1/273 | | | | | | |
|---|---|---|---|---|---|---|
| 0 | 0 | 0 | 0 | 0 | 0 | 0 |
| 0 | 1 | 4 | 7 | 4 | 1 | 0 |
| 0 | 4 | 16 | 26 | 16 | 4 | 0 |

TABLE 2-continued

| 1/273 | | | | | | |
|---|---|---|---|---|---|---|
| 0 | 7 | 26 | 41 | 26 | 7 | 0 |
| 0 | 4 | 16 | 26 | 16 | 4 | 0 |
| 0 | 1 | 4 | 7 | 4 | 1 | 0 |
| 0 | 0 | 0 | 0 | 0 | 0 | 0 |

The width of the square spatial domain two-dimensional Laplacian filter has similar meaning with the width of the square spatial domain two-dimensional Gaussian filter. The width of the square spatial domain two-dimensional Laplacian filter can be pixel values such as 3, 5 or 7, preferably, the width of the square spatial domain two-dimensional Laplacian filter is 3. The square spatial domain two-dimensional Laplacian filter can be filled with pixels in a manner that, fill symmetrically around the square spatial domain two-dimensional Laplacian filter with a pixel point of 0.

Furthermore, before performing filtering processing on the plurality of small image blocks in each sampling image in sequence by using Laplacian-of-Gaussian filters, so as to obtain filtered images of the plurality of small image blocks in each sampling image, the device for detecting interest points in an image also can perform one-to-one correspondence replacement with a pixel value of the square spatial domain two-dimensional Gaussian filter having a width of M, for an area having a width of M on the upper left of a square matrix having a width of X+M−1 and a height of Y+M−1, and perform a cyclic shift to the square matrix with M/2 pixels leftwards and upwards, wherein, all initial pixel values for the square matrix are 0. The object of performing the cyclic shift to the square matrix with M/2 pixels leftwards and upwards is to correct a position offset of filtered images obtained after processing by Laplacian-of-Gaussian filter. If M is an odd number, perform the cyclic shift to the square matrix with (M−1)/2 pixels leftwards and upwards.

Furthermore, before converting the filled square spatial domain two-dimensional Laplacian filter into the frequency domain Laplacian filter, the device for detecting interest points in an image also can perform one-to-one correspondence replacement with a pixel value of the square spatial domain two-dimensional Laplacian filter having a width of M, for an area having a width of M on the upper left of a square matrix having a width of X+M−1 and a height of Y+M−1, and perform a cyclic shift to the square matrix with M/2 pixels leftwards and upwards, wherein, all initial pixel values for the square matrix are 0. The object of performing the cyclic shift to the square matrix with M/2 pixels leftwards and upwards is to correct a position offset of filtered images obtained after processing by Laplacian-of-Gaussian filter. If M is an odd number, perform the cyclic shift to the square matrix with (M−1)/2 pixels leftwards and upwards.

Furthermore, the device for detecting interest points in an image can generate a plurality of frequency domain Laplacian-of-Gaussian filters, according to the plurality of frequency domain Gaussian filters and the frequency domain Laplacian filter.

Moreover, both the frequency domain Gaussian filters and the frequency domain Laplacian filter are generated off line, the frequency domain Laplacian-of-Gaussian filters are also generated off line, and are written into a program code header file corresponding to a method, not necessarily being generated on line. It should be noted that, each pixel point of the above frequency domain small image block is a complex number pixel point consisting of a real part and an imaginary part, each pixel point of the above frequency domain Laplacian-of-Gaussian filter, the frequency domain Gaussian filter and the frequency domain Laplacian filter is also a complex number pixel point consisting of a real part and an imaginary part, and therefore, an operation of performing filtering by using frequency domain Laplacian-of-Gaussian filters on each frequency domain small image block is actually equivalent to taking matrix complex number dot products to the frequency domain small image block and the frequency domain Laplacian-of-Gaussian filters.

1042, The device for detecting interest points in an image performs an inverse discrete Fourier transform on frequency domain Laplacian-of-Gaussian response images of the plurality of small image blocks in each sampling image, so as to obtain filtered images of the plurality of small image blocks in each sampling image.

In the method for detecting interest points in an image provided in the embodiments of the present invention, divide each sampling image into a plurality of small square image blocks having a width of X and a height of Y, with regard to each small square image block having a width of X and a height of Y, perform pixel filling and a discrete Fourier transform, so as to obtain frequency domain small image blocks, perform filtering processing on the plurality of small image blocks in each sampling image by using frequency domain Laplacian-of-Gaussian filters, so as to obtain frequency domain Laplacian-of-Gaussian response images of the plurality of small image blocks in each sampling image, perform an inverse discrete Fourier transform on frequency domain Laplacian-of-Gaussian response images of the plurality of small image blocks in each sampling image, so as to obtain filtered images of the plurality of small image blocks in each sampling image, search interest points in an image for filtered images of the plurality of small image blocks in each sampling image, and place the plurality of small image blocks in the sampling image in the frequency domain for processing, thus further improving the detection speed.

As will be appreciated by persons skilled in the art, all or partial steps of the above method embodiments can be implemented in a program instruction related hardware. The program can be stored in a computer readable medium. When the program is executed, the steps in the above method embodiments are performed; the storage medium includes various media capable of storing program codes, such as a read only memory (ROM), a random access memory (RAM), a floppy disk, or an optical disk and the like.

Figure 7:
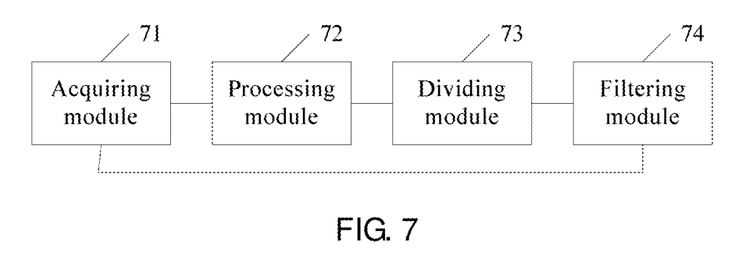
FIG. 7 is a schematic structural diagram of a device for detecting interest points in an image according to an embodiment of the present invention.

FIG. 7 is a schematic structural diagram of the device for detecting interest points in an image according to an embodiment of the present invention, as shown in FIG. 7, the device includes:

an acquiring module 71, configured to acquire an original input image;

a processing module 72, configured to perform down-sampling processing on the original input image, so as to obtain a plurality of sampling images with different resolutions;

a dividing module 73, configured to divide each sampling image into a plurality of small image blocks;

a filtering module 74, configured to perform filtering processing on the plurality of small image blocks in each sampling image in sequence by using Laplacian-of-Gaussian filters, so as to obtain filtered images of the plurality of small image blocks in each sampling image;

wherein, the acquiring module 71 is further configured to acquire interest points in an image in each sampling image, according to the filtered images of the plurality of small image blocks in each sampling image.

In an implementation scenario, the acquiring module 71 can acquire interest points in an image of each small image block, according to the filtered images of the plurality of small image blocks in each sampling image, and acquire interest points in an image in each sampling image, according to the interest points in the image of each small image block.

In another implementation scenario, the acquiring module 71 can merge filtered images of the plurality of small image blocks in each sampling image, so as to obtain a filtered image of each sampling image, and acquire interest points in each sampling image, according to the filtered image of each sampling image.

Moreover, the acquiring module 71 also can merge filtered images of parts of small image blocks in each sampling image, so as to obtain a filtered image of large image blocks, and acquire interest points in an image of a plurality of large image blocks in each sampling image, and then acquire interest points in an image of each sampling image, according to interest points in an image of each large image block in each sampling image.

It should be noted that, the device for detecting interest points in an image can firstly acquire one of the plurality of small image blocks in the sampling image, perform filtering processing on the small image block in sequence by using Laplacian-of-Gaussian filters, so as to obtain a filtered image of the small image block, and acquire interest points in an image of the small image block, according to the filtered image of the small image block; then the device for detecting interest points in an image can acquire the next of the plurality of small image blocks in the sampling image for processing. The device for detecting interest points in an image also can include a plurality of filtering modules 74 and a plurality of acquiring modules 71, one filtering module 74 and one acquiring module 71 can be used to process one of the plurality of small image blocks in the sampling image, while the plurality of filtering modules 74 and the plurality of acquiring modules 71 can be used to process the plurality of small image blocks in the sampling image respectively, and thus the device for detecting interest points in an image can perform processing in parallel on the plurality of small image blocks in the sampling image, thus further improving the detection speed.

In the device for detecting interest points in an image provided in this embodiment, divide each sampling image into a plurality of small image blocks, with regard to each small image block, perform filtering processing by using Laplacian-of-Gaussian filters, search interest points in an image, and obtain filtered images of the plurality of small image blocks, thus reducing memory consumption and improving the detection speed.

Figure 8:
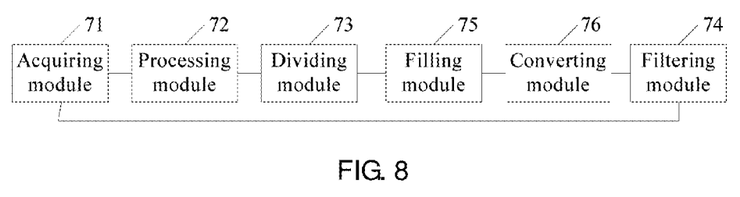
FIG. 8 is a schematic structural diagram of a device for detecting interest points in an image according to another embodiment of the present invention.

FIG. 8 is a schematic structural diagram of the device for detecting interest points in an image according to another embodiment of the present invention, as shown in FIG. 8, on the basis of the embodiments shown in FIG. 7, the device also includes a filling module 75 and a converting module 76;

the dividing module 73 is specifically configured to divide each sampling image into a plurality of small square image blocks having a width of X and a height of Y, wherein, both X and Y are positive integers, if the small image block at the boundary of the sampling image has a width less than X or a height less than Y, then the filling module 75 fills the small image block at the boundary of the sampling image with pixels;

the filling module 75 is further configured to fill each small square image block having a width of X and a height of Y with pixels, so that the filled small square image block has a width of X+M−1 and a height of Y+M−1, wherein M is an positive integer;

the converting module 76 is configured to perform a discrete Fourier transform on the filled small square image block, so as to obtain frequency domain small image blocks.

In the device for detecting interest points in an image provided in this embodiment, divide each sampling image into a plurality of small square image blocks having a width of X and a height of Y, with regard to each small image block having a width of X and a height of Y, perform pixel filling and a discrete Fourier transform, so as to obtain frequency domain small image blocks, with regard to each frequency domain small image block, perform filtering processing by using Laplacian-of-Gaussian filters, search interest points in an image, and obtain filtered images of the plurality of small image blocks, thus reducing memory consumption, place the plurality of small image blocks in the sampling image in the frequency domain for processing, thus further improving the detection speed.

Figure 9:
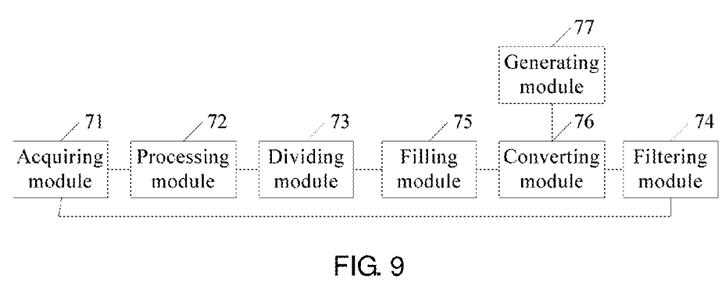
FIG. 9 is a schematic structural diagram of a device for detecting interest points in an image according to still another embodiment of the present invention.

FIG. 9 is a schematic structural diagram of the device for detecting interest points in an image according to still another embodiment of the present invention, as shown in FIG. 9, on the basis of the embodiments shown in FIG. 8, the device for detecting interest points in an image also include: a generating module 77;

before the filtering module 74 performs filtering processing on the plurality of small image blocks in each sampling image in sequence by using frequency domain Laplacian-of-Gaussian filters, so as to obtain filtered images of the plurality of small image blocks in each sampling image, the generating module 77 is configured to generate a plurality of square spatial domain two-dimensional Gaussian filters, according to a two-dimensional Gaussian kernel function and a preset Gaussian parameter, and the plurality of square spatial domain two-dimensional Gaussian filters have a maximum width of M;

the generating module 77 is further configured to generate a square spatial domain two-dimensional Laplacian filter, according to a second-order Laplacian operator function, if the square spatial domain two-dimensional Laplacian filter has a width less than M, and fill the square spatial domain two-dimensional Laplacian filter with pixels, so that the filled square spatial domain two-dimensional Laplacian filter has a width of M;

the converting module 76 is further configured to convert the plurality of square spatial domain two-dimensional Gaussian filters into a plurality of frequency domain Gaussian filters; converting the filled square spatial domain two-dimensional Laplacian filter into the frequency domain Laplacian filter;

generate a plurality of frequency domain Laplacian-of-Gaussian filters, according to the plurality of frequency domain Gaussian filters and the frequency domain Laplacian filter.

Further, the filtering module 74 is specifically configured to perform filtering processing on the plurality of small image blocks in each sampling image in sequence by using frequency domain Laplacian-of-Gaussian filters, so as to obtain frequency domain Laplacian-of-Gaussian response images of the plurality of small image blocks in each sampling image;

the converting module 76 is further configured to perform an inverse discrete Fourier transform on frequency domain Laplacian-of-Gaussian response images of the plurality of small image blocks in each sampling image, so as to obtain filtered images of the plurality of small image blocks in each sampling image.

Furthermore, before the converting module 76 converts the plurality of square spatial domain two-dimensional Gaussian filters into the plurality of frequency domain Gaussian filters, the filling module 75 is further configured to perform one-to-one correspondence replacement with a pixel value of the square spatial domain two-dimensional Gaussian filter having a width of M, for an area having a width of M on the upper left of a square matrix having a width of X+M−1 and a height of Y+M−1, and perform a cyclic shift to the square matrix with M/2 pixels leftwards and upwards, wherein, all initial pixel values for the square matrix are 0;

before the converting module 76 converts the filled square spatial domain two-dimensional Laplacian filter into the frequency domain Laplacian filter, the filling module 75 is further configured to perform one-to-one correspondence replacement with a pixel value of the square spatial domain two-dimensional Laplacian filter having a width of M, for an area having a width of M on the upper left of a square matrix having a width of X+M−1 and a height of Y+M−1, and perform a cyclic shift to the square matrix with M/2 pixels leftwards and upwards, wherein, all initial pixel values for the square matrix are 0.

In the device for detecting interest points in an image provided in the embodiments of the present invention, divide each sampling image into a plurality of small square image blocks having a width of X and a height of Y, with regard to each small image block having a width of X and a height of Y, perform pixel filling and a discrete Fourier transform, so as to obtain frequency domain small image blocks, perform filtering processing on the plurality of small image blocks in each sampling image in sequence by using frequency domain Laplacian-of-Gaussian filters, so as to obtain frequency domain Laplacian-of-Gaussian response images of the plurality of small image blocks in each sampling image, perform an inverse discrete Fourier transform on frequency domain Laplacian-of-Gaussian response images of the plurality of small image blocks in each sampling image, so as to obtain filtered images of the plurality of small image blocks in each sampling image, search interest points in an image for filtered images of the plurality of small image blocks in each sampling image, thus reducing memory consumption, and place the plurality of small image blocks in the sampling image in the frequency domain for processing, thus further improving the detection speed.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for detecting interest points in an image, comprising:
acquiring an original input image;

performing down-sampling processing on the original input image, so as to obtain a plurality of sampling images with different resolutions;

dividing each sampling image into a plurality of small image blocks;

performing filtering processing on the plurality of small image blocks in each sampling image in sequence by using Laplacian-of-Gaussian filters, so as to obtain filtered images of the plurality of small image blocks in each sampling image; and acquiring interest points in an image in each sampling image, according to the filtered images of the plurality of small image blocks in each sampling image.

2. The method according to claim 1, wherein, the dividing each sampling image into the plurality of small image blocks, comprises:

dividing each sampling image into a plurality of small square image blocks having a width of X and a height of Y, wherein, both X and Y are positive integers, if the small image block at the boundary of the sampling image has a width less than X or a height less than Y, then filling the small image block at the boundary of the sampling image with pixels;

filling each small square image block having a width of X and a height of Y with pixels, so that a filled small square image block has a width of X+M−1 and a height of Y+M−1, wherein M is an positive integer;

performing a discrete Fourier transform on the filled small square image block, so as to obtain frequency domain small image blocks.

3. The method according to claim 2, wherein, the performing filtering processing on the plurality of small image blocks in each sampling image in sequence by using the Laplacian-of-Gaussian filters, so as to obtain filtered images of the plurality of small image blocks in each sampling image, comprises:

performing multiple filtering processing on the plurality of small image blocks in each sampling image by using frequency domain Laplacian-of-Gaussian filters, so as to obtain frequency domain Laplacian-of-Gaussian response images of the plurality of small image blocks in each sampling image;

performing an inverse discrete Fourier transform on each of the frequency domain Laplacian-of-Gaussian response images of the plurality of small image blocks in each sampling image, so as to obtain filtered images of the plurality of small image blocks in each sampling image.

4. The method according to claim 3, wherein, before performing filtering processing on the plurality of small image blocks in each sampling image in sequence by using the Laplacian-of-Gaussian filters, so as to obtain filtered images of the plurality of small image blocks in each sampling image, the method comprises:

generating a plurality of square spatial domain two-dimensional Gaussian filters, according to two-dimensional Gaussian kernel functions and preset Gaussian parameters, and the plurality of square spatial domain two-dimensional Gaussian filters have a maximum width of M;

generating a square spatial domain two-dimensional Laplacian filter, according to a second-order Laplacian operator function, if the square spatial domain two-dimensional Laplacian filter has a width less than M, filling the square spatial domain two-dimensional Laplacian filter with pixels, so that a filled square spatial domain two-dimensional Laplacian filter has a width of M;

converting the plurality of square spatial domain two-dimensional Gaussian filters into a plurality of frequency domain Gaussian filters; converting the filled square spatial domain two-dimensional Laplacian filter into a frequency domain Laplacian filter;

generating a plurality of frequency domain Laplacian-of-Gaussian filters, according to the plurality of frequency domain Gaussian filters and the frequency domain Laplacian filter;

before converting the plurality of square spatial domain two-dimensional Gaussian filters into the plurality of frequency domain Gaussian filters, the method further comprises: performing one-to-one correspondence replacement with a pixel value of the square spatial domain two-dimensional Gaussian filter having a width of M, for an area having a width of M on the upper left of a square matrix having a width of X+M−1 and a height of Y+M−1, and performing a cyclic shift to the square matrix with M/2 pixels leftwards and upwards, wherein, all initial pixel values for the square matrix are 0;

before converting the filled square spatial domain two-dimensional Laplacian filter into the frequency domain Laplacian filter, the method further comprises:

performing one-to-one correspondence replacement with a pixel value of the square spatial domain two-dimensional Laplacian filter having a width of M, for an area having a width of M on the upper left of a square matrix having a width of X+M−1 and a height of Y+M−1, and performing a cyclic shift to the square matrix with M/2 pixels leftwards and upwards, wherein, all initial pixel values for the square matrix are 0.

5. The method according to claim 1, wherein, the acquiring the interest points in the image in each sampling image, according to the filtered images of the plurality of small image blocks in each sampling image, comprises:

acquiring interest points in an image of each small image block, according to the filtered images of the plurality of small image blocks in each sampling image;

acquiring interest points in an image in each sampling image, according to the interest points in the image of each small image block;

or, merging filtered images of the plurality of small image blocks in each sampling image, so as to obtain a filtered image of each sampling image;

acquiring interest points in each sampling image, according to the filtered image of each sampling image.

6. A device for detecting interest points in an image, comprising:

an acquiring module, configured to acquire an original input image;

a processing module, configured to perform down-sampling processing on the original input image, so as to obtain a plurality of sampling images with different resolutions;

a dividing module, configured to divide each sampling image into a plurality of small image blocks;

a filtering module, configured to perform filtering processing on the plurality of small image blocks in each sampling image in sequence by using Laplacian-of-Gaussian filters, so as to obtain filtered images of the plurality of small image blocks in each sampling image;

wherein the acquiring module is further configured to acquire interest points in an image in each sampling image, according to the filtered images of the plurality of small image blocks in each sampling image.

7. The device according to claim 6, further comprising: a filling module and a converting module; wherein
the dividing module is specifically configured to divide each sampling image into a plurality of small square image blocks having a width of X and a height of Y, wherein, both X and Y are positive integers, if the small image block at the boundary of the sampling image has a width less than X or a height less than Y, then the filling module fills the small image block at the boundary of the sampling image with pixels;
the filling module is further configured to fill each small square image block having a width of X and a height of Y with pixels, so that a filled small square image block has a width of X+M−1 and a height of Y+M−1, wherein M is an positive integer;
the converting module is configured to perform a discrete Fourier transform on the filled small square image block, so as to obtain frequency domain small image blocks.

8. The device according to claim 7, wherein, the filtering module is specifically configured to perform multiple filtering processing on the plurality of small image blocks in each sampling image by using frequency domain Laplacian-of-Gaussian filters, so as to obtain frequency domain Laplacian-of-Gaussian response images of the plurality of small image blocks in each sampling image;
the converting module is further configured to perform an inverse discrete Fourier transform on each of the frequency domain Laplacian-of-Gaussian response images of the plurality of small image blocks in each sampling image, so as to obtain filtered images of the plurality of small image blocks in each sampling image.

9. The device according to claim 8, further comprising: a generating module; wherein
before the filtering module performs filtering processing on the plurality of small image blocks in each sampling image in sequence by using a frequency domain Laplacian-of-Gaussian filters, so as to obtain filtered images of the plurality of small image blocks in each sampling image, the generating module is configured to generate a plurality of square spatial domain two-dimensional Gaussian filters, according to two-dimensional Gaussian kernel functions and preset Gaussian parameters, and the plurality of square spatial domain two-dimensional Gaussian filters have a maximum width of M;
the generating module is further configured to generate a square spatial domain two-dimensional Laplacian filter, according to a second-order Laplacian operator function, if the square spatial domain two-dimensional Laplacian filter has a width less than M, fill the square spatial domain two-dimensional Laplacian filter with pixels, so that a filled square spatial domain two-dimensional Laplacian filter has a width of M;
the converting module is further configured to convert the plurality of square spatial domain two-dimensional Gaussian filters into a plurality of frequency domain Gaussian filters; converting the filled square spatial domain two-dimensional Laplacian filter into a frequency domain Laplacian filter;
generate a plurality of frequency domain Laplacian-of-Gaussian filters, according to the plurality of frequency domain Gaussian filters and the frequency domain Laplacian filter;
before the converting module converts the plurality of square spatial domain two-dimensional Gaussian filters into the plurality of frequency domain Gaussian filters, the filling module is further configured to perform one-to-one correspondence replacement with a pixel value of the square spatial domain two-dimensional Gaussian filter having a width of M, for an area having a width of M on the upper left of a square matrix having a width of X+M−1 and a height of Y+M−1, and perform a cyclic shift to the square matrix with M/2 pixels leftwards and upwards, wherein, all initial pixel values for the square matrix are 0;
before the converting module converts the filled square spatial domain two-dimensional Laplacian filter into the frequency domain Laplacian filter, the filling module is further configured to perform one-to-one correspondence replacement with a pixel value of the square spatial domain two-dimensional Laplacian filter having a width of M, for an area having a width of M on the upper left of a square matrix having a width of X+M−1 and a height of Y+M−1, and perform a cyclic shift to the square matrix with M/2 pixels leftwards and upwards, wherein, all initial pixel values for the square matrix are 0.

10. The device according to claim 6, wherein, the acquiring module acquires interest points in an image in each sampling image, according to the filtered images of the plurality of small image blocks in each sampling image, the acquiring module is specifically configured to:
acquire interest points in an image of each small image block, according to the filtered images of the plurality of small image blocks in each sampling image;
acquire interest points in an image in each sampling image, according to the interest points in the image of each small image block;
or, the acquiring module is specifically configured to:
merge filtered images of the plurality of small image blocks in each sampling image, so as to obtain a filtered image of each sampling image;
acquire interest points in each sampling image, according to the filtered image of each sampling image.

* * * * *